(12) United States Patent
Zhou et al.

(10) Patent No.: US 8,575,750 B1
(45) Date of Patent: Nov. 5, 2013

(54) SEMICONDUCTOR DETECTOR ELEMENT CONFIGURATION FOR VERY HIGH EFFICIENCY GAMMA-RAY DETECTION

(76) Inventors: Yongdong Zhou, Oak Ridge, TN (US); Xiao Zhou, Oak Ridge, TN (US)

( * ) Notice: Subject to any disclaimer, the term of this patent is extended or adjusted under 35 U.S.C. 154(b) by 103 days.

(21) Appl. No.: 13/136,374

(22) Filed: Jul. 29, 2011

Related U.S. Application Data

(60) Provisional application No. 61/401,386, filed on Aug. 12, 2010.

(51) Int. Cl.
*G01T 1/166* (2006.01)
*G01T 1/164* (2006.01)

(52) U.S. Cl.
USPC ............ 257/741; 257/E23.092; 257/442; 257/93; 257/E31.015; 257/E21.002; 250/390.04; 250/366; 250/369; 250/255; 250/362; 250/363.03; 250/370.11; 378/159; 252/513; 252/500; 252/519.4

(58) Field of Classification Search
USPC ........... 250/390.04, 366, 367, 369, 255, 362, 250/363, 363.03, 363.04, 370.11, 370.01, 250/370.09; 378/159; 257/741, E23.09, 257/442, 93, E31.015, E21.002; 252/513, 252/500, 519.4, 512, 514
See application file for complete search history.

(56) References Cited

U.S. PATENT DOCUMENTS

| | | | | |
|---|---|---|---|---|
| 4,841,153 A | * | 6/1989 | Wormald | 250/390.04 |
| 5,391,882 A | * | 2/1995 | Rhiger | 250/370.13 |
| 6,781,132 B2 | * | 8/2004 | McGregor | 250/370.09 |
| 2004/0149919 A1 | * | 8/2004 | Lechner et al. | 250/370.01 |
| 2008/0203514 A1 | * | 8/2008 | Szeles | 257/442 |
| 2010/0200762 A1 | * | 8/2010 | Stein et al. | 250/370.11 |
| 2011/0127435 A1 | * | 6/2011 | Nakamura | 250/362 |
| 2011/0186788 A1 | * | 8/2011 | Hackenschmied et al. | 252/513 |
| 2011/0298131 A1 | * | 12/2011 | Hull et al. | 257/741 |

* cited by examiner

*Primary Examiner* — Michael Shingleton

(57) ABSTRACT

A radiation detector made of High Purity Germanium (HPGe) has been specially machined to be this invented multilayer Inter-Coaxial configuration. With this special configuration, extra large volume HPGe detectors of diameters to be 6 inches, 9 inches, and even 12 inches, can be produced with current achievable HPGe crystal purity and quality, in which the entire detector crystal will be depleted and properly over biased for effective photo-induced signal collection with just less than 5000V bias applied. This invention makes extra large efficiency of 200%, 300%, and maybe even higher than 500% possible with HPGe gamma ray detectors with reasonable great resolution performances procurable based on current HPGe crystal supply capability. The invention could also be applied to any other kind of semiconductor materials if any of them could be purified enough for this application in the future.

7 Claims, 2 Drawing Sheets

SEMICONDUCTOR DETECTOR ELEMENT CONFIGURATION FOR VERY HIGH EFFICIENCY GAMMA-RAY DETECTION

This is the corrected application for the non-provisional patent application Ser. No. 13/136,374 that is following the provisional application of application number of "61/401,386", which was filed in Aug. 12, 2010

TECHNICAL FIELD

This invention relates to a semiconductor gamma ray detector, and more particularly at current time, to a very high efficiency High Purity Germanium (HPGe) gamma ray detector application.

BACKGROUND ART

Semiconductor crystals have been used on photon radiation detection from far infrared, infrared, visible, ultraviolet, X-ray, gamma Ray, and even energized particle detection for decades. Different radiation detection needs require different semiconductor material and special technology accordingly. In order to collect photon-induced signal carriers, the space-charge-layer of an electronic-field needs to be established inside the semiconductor detector crystal. This normally is achieved by fabricating a P-N junction or a proper surface barrier contact. Because of the extreme high penetration of high-energy gamma rays, the detector depletion-zone, or space-charge-layer, needs to be enlarged enough depending on the need of detection efficiency. The thickness of the depletion layer depends on the reverse bias voltage applied to the junction area and the doping level of the semiconductor crystal. The higher the reversed bias voltage applied, the thicker the depletion layer will be. At the same time, the lower the impurity concentration of the applied semiconductor crystal, the thicker the depletion layer. A gamma ray semiconductor detector normally is reverse biased by thousands of volts to deplete the entire crystal region. But too high bias makes the final application very difficult. So 5000V has been the maximum bias in industry practice for this application[1,2].

A common semiconductor device has a depletion layer thickness of only μm-scale, which makes the detection of high-energy gamma ray almost impossible. Because of this doping impurity concentration of the applied semiconductor crystal for gamma ray detection needs to be suppressed significantly. Lithium drift technique was invented over 4 decades ago on both germanium [Ge(Li)] and silicon [Si(Li)] for the purpose of X-ray and gamma ray detection applications[3]. Lithium drift silicon detector [Si(Li)] is still being manufactured today. But, the Lithium drift germanium detector needs to be kept at 80K to keep the drifted lithium from drifting away from the compensated impurity. This makes the detector hard to be used, and transported in field. So Ge(Li) detector was substituted by High Purity Germanium (HPGe) detector as soon as the HPGe crystal was achieved[4,5]. The first applied semiconductor detector structure for this application was a sandwich planar configuration of an intrinsic semiconductor detecting layer sandwiched between a P+ and a N+ contact layer[6]. The net residual active impurities concentration of a semiconductor crystal for gamma ray photon detecting need to be purer than $5 \times 10^{10}$ cm$^{-3}$ level, which is about $10^5$ times purer than the typical unintentionally doped semiconductor crystal. Germanium, silicon, CdTe, and CdZnTe are commonly used for gamma ray detecting. But germanium is still the only semiconductor material that has been purified enough to be used as a High Purity (HP) semiconductor gamma ray detector. Even an HPGe planar detector is typically made to deplete less than 20 mm thick. A 100% or 150% relative efficiency planer gamma ray detector, efficient at 1.33 MeV, needs the applied germanium crystal to deplete over 100 mm thick. So the planar types of germanium detector are typically for X-ray and low energy gamma ray applications of very low efficiency.

Coaxial geometry HPGe detectors were invented to achieve a large active volume, (high efficiency), gamma ray detector. Over 95% of the HPGe detectors are fabricated in standard closed-ended coaxial configuration every year. There are also a few other kinds of special HPGe detector configurations being manufactured. They are all very close to a typical planar, coaxial, or a combination of these two kinds of structures for particular applications, and are typically of very low efficiency used in X-ray or low energy gamma ray detection. Higher efficiency, typically higher than 10%, gamma ray detectors have been using the standard closed-ended bulletized coaxial detector configuration for decades.

SUMMARY OF INVENTION

Technical Problem

A typical High Purity Germanium (HPGe) gamma ray detector element has a crystal diameter of two to three inches. Occasionally a detector grade HPGe crystal of close to four-inch diameter can be achieved. Even though 100% N-type, 150% P-type HPGe detectors can be purchased on the market[7,8], the delivery time of such a large volume detector can be longer than a year after the order is placed. It is hard to make an over 100% efficiency HPGe detector for the following reasons. $1^{st}$, larger volume crystal detectors need much purer crystals since the operating bias still need to be less the 5000V. It is at the limit level of current manufacturing technology to make an over 100% efficiency HPGe detector. $2^{nd}$, after the entire crystal volume is depleted, over bias of 100V/mm is always needed for germanium, or any other semiconductor materials applied, to drive electron and hole mobility to approach a plateau (saturation mobility) of about $10^7$ cm/s[1]. So the larger volume crystal applied needs the higher over bias to effectively collect the carriers, which left the applicable bias for crystal depletion even lower. $3^{rd}$, the actual situation is even tougher, because there are always lots of carrier-trapping centers presented inside a real crystal. In reality, a real gamma ray detector needs significant over bias to overcome the trapping effect happening in depleted crystals to bring the final detector performance inside specification. The larger the detector volume applied, the longer the carriers need to travel before they are collected, and the more chances the carriers will get trapped and not be collected within the effective time window. Even more over bias is needed for suppressing this trapping effect. What is happening in the HPGe detector industry right now for producing over 100% gamma ray detectors is: keep on trying to grow large crystals, then make them to be a large volume detectors, then test them to see if they meet the detector performance specification. If the crystal is not good enough for this large volume detector, which often happens, the crystal will have to be ground down for smaller volume detector manufacturing. The customer will have to wait for next time to see if the crystal will be good enough for his order. For many customers, they might have to give up their plan because the manufacturers could refuse these high efficiency detector orders because of the difficulty in producing the crystal.

New technology of much better purity controlling and trapping-center free crystal growth technology needs to be developed before high efficiency, such as 200% or even higher, HPGe gamma ray detectors of useful performance can be achieved. This has been a struggle for decades, and is still open for improvement.

People are using multiple HPGe detector array for special needs, such as Port-monitor. But this makes the entire detecting system much more complicated. For this solution to achieve high efficiency gamma ray detection is not very desirable, because the system of multi detector elements loses a lot of signal because of Compton scattering. These entire lost signal contributes to spectra at Compton continuum in the low energy zone, which degrades the low energy gamma ray detect ability of the system. Multi detector elements need multi electronic systems, which make the entire system have a much higher background noise. That is why high efficiency gamma ray detector elements are always desired, even though the price is nonlinearly high.

Is there any other approach to develop a very high efficiency High-Purity semiconductor gamma ray detector based on current crystal grow technology or do we have to wait until the high quality semiconductor crystals can be developed first? This invention answers the question.

Solution to Problem

The normal size of a typical HPGe coaxial gamma ray detector is about 3 inches in diameter, but generally not more that 4 inches, because of depletion and effective charge collection reasons. The point of the problem is that current HPGe crystals are just good enough for producing detector of radius less than 2 inches. The depletion zone thickness of a coaxial HPGe detector with useful spectrum resolutions, from $P^+$ to $N^+$ contact layers, is typically limited to about 1.5 inches owing to current achievable crystal quality. Efforts have been put forward for decades to solve this problem, but it has not been improved yet. Is there any other solution to answer this question?

We are presenting a solution to produce very large efficient HPGe gamma ray detector of 150%, 200%, 300%, up to even over 1000%, with current achievable HPGe crystal quality of purity level and crystallography. This solution could also be applied to any other kind of semiconductor materials if any of them can be purified enough for this application in the future. The idea of this new invention of unique detector element configuration is displayed in FIG. 1.

This invention solves the problem with a new detector configuration, shown in FIG. 1. This configuration does not rely on improving crystal development. The new innovated radiation detector is comprised of a semiconductor having been machined with an additional deep coaxial groove at about radially-middle from the closed end of a typical closed-end coaxial Gamma Ray detector structure. With this unique structure, the new final semiconductor detector crystal comprising radially two layers of coaxial structures, in which the general inner cylindrical and coaxial surface of the deep groove to be the outer surface of the inner coaxial structure and the general outer cylindrical and coaxial surface of the deep groove to be the center surface of the outer coaxial structure. This new final structure looks like a coaxial structure that has been rolled up all the way from the open end to the closed end. The entire central hollow cylinder surface, the original open end of the detector, which could now be generally bulletized as described in FIG. 1, and together with the outer cylindrical surface of the detector is formed to be one electrode of the innovated detector. This electrode could be either an anode or a cathode. The entire deep groove surface together with the center surface of the original closed end, which could also be generally bulletized as described in FIG. 1, is formed to be the other counter electrode of the new detector. Both anode and cathode now are open at the annular outer part of the original closed end, which is now the passivated surface of the new detector.

An HPGe crystal of 3-inch diameter can be produced to be a gamma ray detector with standard coaxial configuration. The thickness of the depletion zone of this standard coaxial configuration, from $P^+$ contact layer to $N^+$ contact layer, is about 1.5 inches, which is reasonably achievable for current available crystal quality. An HPGe crystal of 6-inch diameter can be produced to be a gamma ray detector with this new invented inter-coaxial configuration shown in FIG. 1. This new configured detector of the entire detector diameter to be 6-inch for unbelievable high efficiency gamma ray detector application has a thickness of a depletion zone, from $P^+$ contact layer to $N^+$ contact layer, of also just about 1.5-inch, which is also the same of a 3-inch diameter standard coaxial detector and so this is reasonably achievable for current available crystal quality.

An HPGe crystal of even larger diameter, such as 9-inch, can be produced to be a gamma ray detector with this new invented Inter-coaxial configuration shown in FIG. 2. The radiation detector comprising a semiconductor having been generally machined with two additional deep coaxial grooves at the diameters of about 3 inch and 6 inch from the closed-end and opened-end of a typical coaxial Gamma Ray detector respectively. This new innovated detector crystal comprising radially three layers of coaxial structure, and the final new structure looks like a two-layer coaxial structure described in FIG. 1 been rolled up back again all the way to the other end. Now the entire central hollow cylinder surface, the entire surface of new added deep groove at diameter of about 6 inch, and connecting together with the center annular part of the original opened end forms one electrode of the new innovated detector, which can be an anode or a cathode. The entire deep groove surface at the diameter of about 3 inch, the outer cylindrical surface, and the remaining area of the original closed end join together forming the other counter electrode of the new inter-coaxial detector, which is the cathode or the anode respectively. Both so-called anode and cathode are now open at the outmost annular part of the original opened end that now becomes the passivated surface of the detector.

This detector of the entire diameter to be 9 inches for unbelievable extra high volume has a thickness of depletion zone, from $P^+$ contact layer to $N^+$ contact layer, of also about 1.5 inch, which is again the same of a 3-inch diameter standard coaxial detector and so is reasonably achievable for current available crystal quality.

It will not be a problem for a 12-inch diameter, 15-inch diameter, and so on, HPGe crystal of just current reasonable purity and crystallography quality produced to be a useful even higher efficiency gamma ray detectors of a depletion zone thickness of just 1.5 inch for depleting and effectively charge collecting at less than 5000V using this new invented detector element configuration by simply adding additional new deep coaxial grooves.

Advantageous Effects of this Invention

This invention of new detector element configuration will overcome almost all the problems on very large efficiency gamma ray semiconductor detector fabrication mentioned above based on current high purity germanium crystal technology.

First, the bias voltage, of 5000V maximum, needed to deplete the entire crystal, depends on the crystal thickness between the two contact layers, P+ and N+ layers, if the doping level remains the same, not the entire detector crystal diameter. In instance of an 9-inch diameter extra large volume crystal detector of traditional coaxial configuration, it will need much higher than 5000V bias to deplete the entire crystal of the impurity to be about $1 \times 10^{10}$ cm$^{-3}$. To make such a large volume detector with traditional coaxial configuration to work, first the crystal needs to be much purer than the current technique limits. But if the crystal of the same extra large volume being formed as this new invented Inter-Coaxial configuration of three integrated coaxial layers, shown in FIG. 2, the detector will be easily depleted at lower than 4000V with the crystal impurity concentration to be about $1 \times 10^{10}$ cm$^{-3}$. 12-inch diameter single crystal technique has been in industry for over ten years[9,10] and purifying HPGe crystal to $1 \times 10^{10}$ cm$^{-3}$ has been achieved in industry for close to 40 years[5].

Second, after the entire crystal volume is depleted, an over bias of 100V/mm is always needed for germanium to drive electron and hole mobilities to approach a plateau (saturation mobility) of about $10^7$ cm/s for effective charge collection. It is impossible to do this on a traditional coaxial detector configuration if the crystal size is beyond a limit (3-4 inches depending on the crystal purity and quality). But the detector of the new invented configuration will not have such a limit no matter how large a volume crystal is applied, because there is always another layer of inter-coaxial structure that can be added if it is necessary.

Third, the photo-induced carriers will not need to travel a large distance from the center to the edge of the entire crystal before they are effectively collected. This will reduce the chance for the photo-induced carriers to be trapped at trapping centers in crystal from being collected.

Forth, it is possible to achieve a traditional N-type coaxial HPGe detector, normally in favor of a thin P+-type contact on the outside of the crystal, using P-type HPGe crystal. Typically a P-type crystal is easier to produce since the N-type crystal tends to have more carrier trapping centers than the P-type HPGe crystal.

Fifth, the detector final structure could be optimized according to the crystal carrier concentration and crystallography quality distribution. For example, if the outer crystal is dirtier, or crystallography is poorer, than that in the center, the thickness of the outer layer coaxial structure can be designed to be thinner.

Sixth, the electronic field in the entire detecting depleted crystal zone for collecting photo-induced carriers of the new multilayer Inter-Coaxial configuration will be much more homogeneous than that of the traditional single-layer coaxial configuration. This gives the final detector overall much better resolution performances especially for high-energy gamma ray detection.

Seventh, extra over bias is needed for most crystals to overcome the charge trapping effect in real crystal. This new invented configuration will do better with certain over bias applied as compared to the traditional coaxial configuration. In another words, raising a certain amount of bias to the new invented detectors will harvest a much higher electrical-field increasing than that of a traditional coaxial configuration detector of the same diameter.

INDUSTRIAL APPLICABILITY

Thematically there is no special new technology needed to introduce this new invention of Inter-Coaxial detector configuration into current HPGe manufacturing industry to achieve the application of this very useful extra-large efficiency semiconductor gamma ray detector. The current crystal machining technique, P+ contact layer ion implantation technique, N+ contact layer of lithium diffusion technique, surface passivation technique, and even loading and packing techniques, etc., could be adopted to this new type of detector fabrication. Germanium zone fining purification technique has been in business for decades. 12-inch diameter crystal growth has not been a problem for over 10 years. Basically it should be able to make this new invention to manufacturing based on current well-developed HPGe gamma ray detector technology.

REFERENCES (1). IEEE Standard Test Procedures for Germanium Gamma-Ray Detectors, IEEE Std 325-1996, Published by the Institute of Electrical and Electronics Engineers, Inc., 345 East 47$^{th}$ Street, New York, N.Y. 10017, USA. 29 May, 1997.
(2). IEEE Standard Test Procedures for Semiconductor X-Ray Energy Spectrometers, IEEE Std 759-1984, Published by the Institute of Electrical and Electronics Engineers, Inc., 345 East 47$^{th}$ Street, New York, N.Y. 10017, USA. Dec. 15, 1984.
(3). Freck D V, Wakefield J. Nature 1962:193:669.
(4). Materials Science in Semiconductor Processing. Vol. 9, Num. 4-5, August/October 2006
(5). E. E. Haller, Germanium: From its Discovery to SiGe devices, Materials Science in Semiconductor Processing. Vol. 9, 2006, 408-422
(6). Glenn F. Knoll, Radiation Detection and Measurement, 3$^{rd}$ edition. John Wiley & Sons, Inc. 1999
(7). ORTEC Products Group at AMETEK, since 1960, 801 South Illinois Avenue, Oak Ridge, Tenn., 37831-0895, USA. http://www.ortec-online.com/solutions/index.aspx.
(8). Canberra Industries Inc. at AREVA, for 40 years, 800 Research Parkway, Meriden, Conn., 06450, USA. http://www.can berra.com/products.
(9). Ben Depuydt, Antoon Theuwis, Igor Romandic, Materials Science in Semiconductor Processing. Vol. 9, 2006, 437-443.
(10). Umicore Electro-optic Materials. Watertorenstraat 33, 2250 Olen, Belgium. http://eom.unicore.com/en/materials/products/germaniumForGammaRayDetectors/.

BRIEF DESCRIPTION OF THE DRAWING

A better understanding of this invention can be gained from a consideration of the following detailed description of the preferred embodiments thereof, in conjunction with the appended drawing, wherein.

DESCRIPTION OF THE PREFERRED EMBODIMENTS

Figure 1:
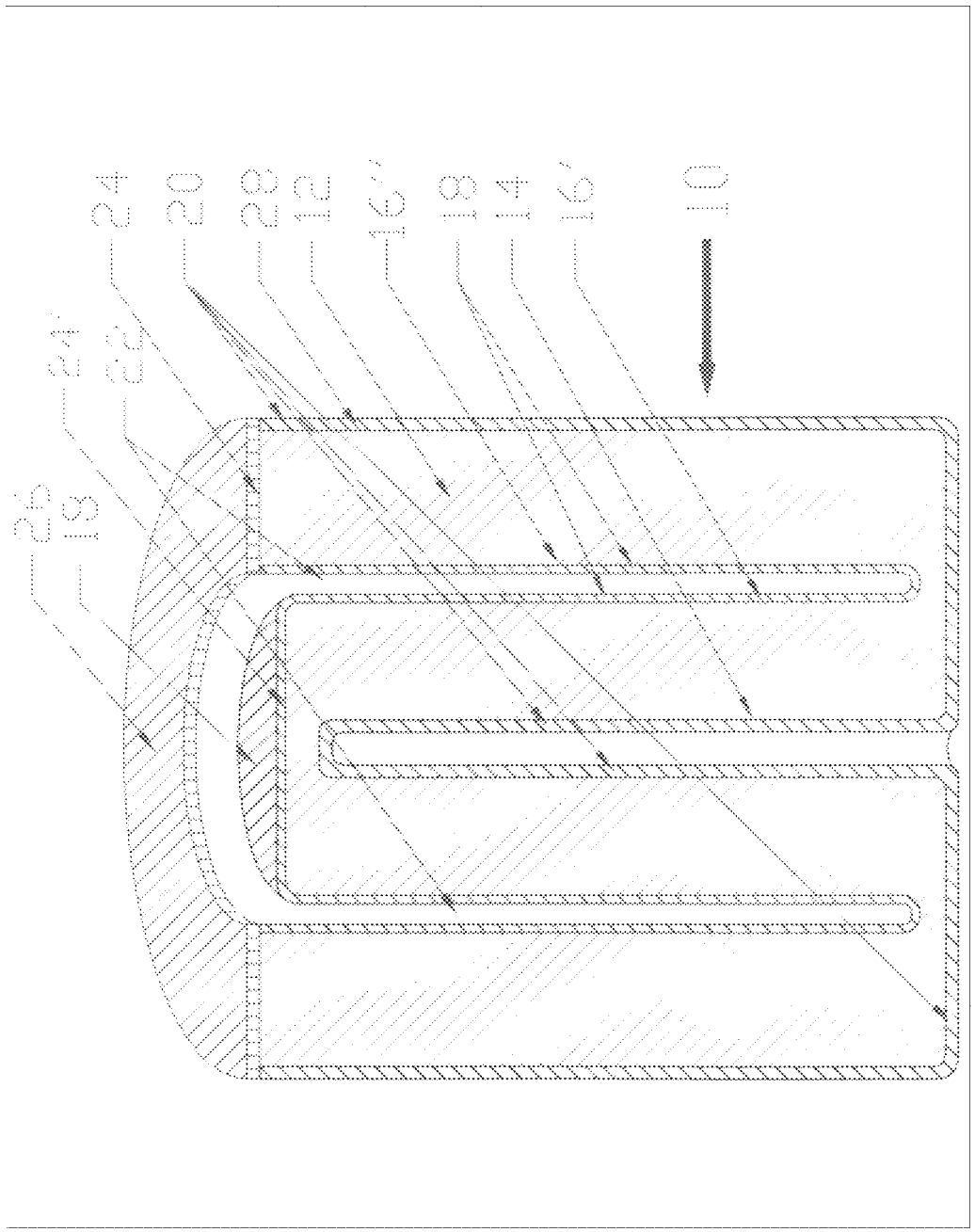
FIG. 1 is an example of a high purity germanium gamma ray detector element structure of this invented new 2-layer inter-coaxial gamma ray detector element for extra-large efficiency gamma ray detector applications. In this example the outer side contact (20) of the crystal, which is shown in blue if the Fig is printed in color, is heavy doped P-type germanium crystal layer, and the other side contact (18) of the crystal, which is shown in red if the Fig is printed in color, is heavily doped N-type germanium layer. The contact sides can be switched, in which either side contact can be N+ if the other side contact is P+.

FIG. 1 shows a semiconductor radiation detector 10 in accordance with the invention. This radiation detector is comprised of a semiconductor 12 having been machined with an additional deep coaxial groove 22 about radially-middle from the original closed end of a typical closed-end coaxial High Purity Germanium Gamma Ray detector structure, making the new final semiconductor crystal to comprise radially two layers of coaxial structure. In this new invented detector structure, the inner cylindrical surface 16' of the new added deep groove 22 becomes the outer surface of the inner coaxial structure. The outer cylindrical surface 16" of the deep groove 22 becomes the center surface of the outer coaxial structure. The final new structure looks like a typical coaxial structure that has been rolled up all the way from the open end to the closed end. Now, the entire central hollow cylinder surface 14 rolled up together with the outer cylindrical surface 28 becomes an electrode 20 of the new detector 10 (either an anode or a cathode). The entire deep groove surface 16' & 16" together with the center surface 24' of the original closed end, which could now be generally bulletized as described in FIG. 1, forms the other counter electrode 18 of the detector 10 (either the cathode or the anode respectively). Both the anode and cathode are open at the annular outer part 24 of the original closed end, which now is the passivated surface of the detector. The passivation layer 26 can be either a deposition layer of proper dielectric material thin film, e.g. $SiO_2$, or simply the native oxidized layer of crystal surface. The electrode layers of 18 and 20 can also be either a deposition layers of proper metal materials, e.g. gold, palladium, etc, for a right arrangement of correct surface barriers, or simply the thin native semiconductor surface layers that been converted to be either P⁺ layer for cathode or N⁺ layer for anode.

Figure 2:
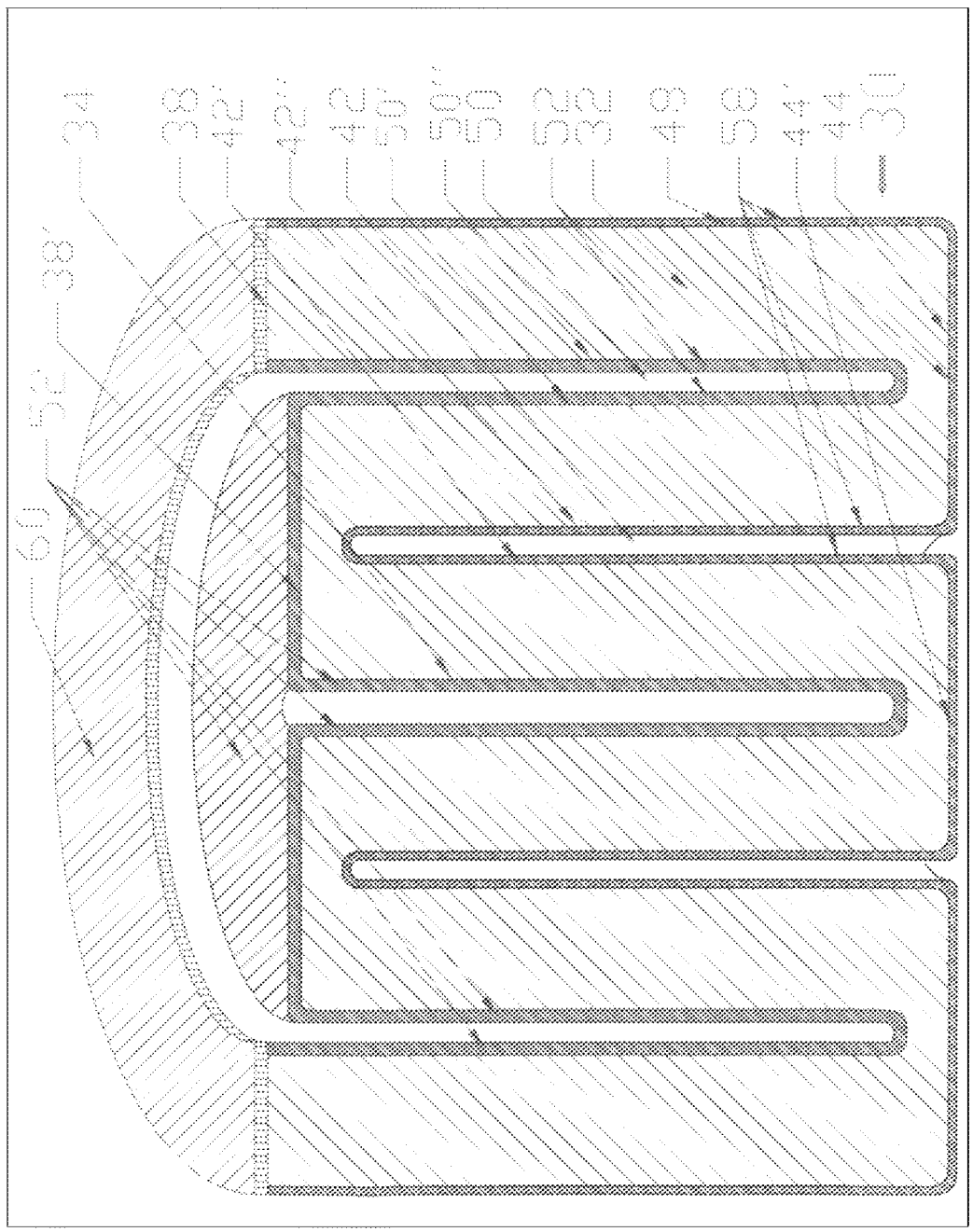
FIG. 2 is an example of a high purity germanium gamma ray detector element structure of this invented new 3-layer inter-coaxial gamma ray detector element for extra-large efficiency gamma ray detector applications. In this example, the outer side contact (58) of the crystal, which is shown in blue if the Fig is printed in color, is heavy doped P-type germanium crystal layer, and the other inside contact (52), which is shown in red if the Fig is printed in color, is heavily doped N-type germanium. The contact sides can be switched, in which either side contact can be N⁺ if the other side contact is P⁺.

An HPGe crystal of even larger diameter, e.g. 9-inch, can be produced to be a gamma ray detector with this new invented inter-coaxial configuration shown in FIG. 2. The radiation detector 30 comprising a semiconductor 32 having been generally machined with two additional deep coaxial grooves 42 & 50 at the diameters of about 3 inch and 6 inch from the closed-end and opened-end of a typical coaxial high purity germanium Gamma Ray detector respectively. This new innovated detector 30 comprising radially three layers of coaxial structure. The final new structure looks like the outer layer crystal of the two-layer coaxial structure detector 10 described in FIG. 1 been rolled up back again all the way to the other end. Now the entire central hollow cylinder surface 34, the entire deep groove surface 50' & 50" of the new added deep groove at diameter of about 6 inch, connecting together with the center annular part 38' of the original opened-end forms one electrode 52 of the new innovated detector 30, which can be an anode or a cathode. The entire deep groove surface 42' & 42" at the diameter of about 3 inch, the outer cylindrical surface 48, and the entire remaining area 44' & 44 of the original closed end join together forming the other counter electrode 58 of the new inter-coaxial detector 30, which is the cathode or the anode respectively. Both so-called anode and cathode, 52 & 58 are now open at the outermost annular part 38 of the original opened end that now becomes the passivated surface of the detector. The passivation layer 60 can be either a deposition layer of a proper dielectric material, e.g. $SiO_2$, or simply the native oxidized layer of crystal surface. The electrode layers of 52 and 58 can also be either a deposition layers of proper metal materials, e.g. gold, palladium, etc, for a right arrangement of correct surface barrier, or simply the thin native semiconductor surface layers that been converted to be either P⁺ layer for cathode or N⁺ layer for anode.

More coaxial layers could be added in when even larger diameter crystal detector needs to be achieved, by adding more deep coaxial grooves to the detector similarly like the way that described in FIG. 1 and FIG. 2.

The invention solves the problems on high-resolution large-efficiency high purity germanium semiconductor gamma-ray detector by properly converting traditional single layer coaxial detector configuration to be this unique multilayer coaxial configuration structures. This new invented multilayer inter-coaxial structure detector of proper added-in deep-groove electrodes will be capable of overcoming almost all the problems that have existed for decades described above based on current available high purity germanium crystal technology.

1st, multiple coaxial layer structure makes large diameter detector with reasonable crystal impurity concentration of about $1\times10^{10}$ cm$^{-3}$ capable be depleted with the bias voltage within current industry application range of 5000V. 2nd, multilayer coaxial structure makes the separation distance from anode to cathode times smaller than the entire detector radius. So the semiconductor detector will always have enough over bias after the entire crystal volume is depleted, e.g. 100V/mm for germanium, to drive photon generated electron and hole mobilities to approach a plateau (saturation mobility), e.g. about $10^7$ cm/s for germanium, for effective charge collection. 3rd, the photo-induced carriers will not need to travel a large distance from the center to the edge of the entire crystal before they are effectively collected, which reduces the chance for the photo-induced carriers to be trapped at trapping centers in the crystal from being collected. 4th, it is possible to achieve a traditional N-type coaxial HPGe detector, which is in favor of a thin P⁺-type contact on the outside of the crystal, using P-type HPGe crystal that is easier to be produced. 5th, the detector final structure could be optimized according to each crystal, achieving overall better detector performance. 6th, the electronic field in the entire detecting depleted crystal zone for collecting photo-induced carriers of the new multilayer Inter-Coaxial configuration is naturally much more homogeneous than that of the traditional single-layer coaxial configuration. 7th, this new invented multilayer coaxial configuration will harvest a much higher electrical-field increasing when raising a certain amount of bias applied on detector, comparing to that of a traditional single layer coaxial configuration detector of the same diameter.

The invention claimed is:
1. A semiconductor Gamma Ray detector comprising:
a cylindrical semiconductor body of crystal construction having two ends at one end a center hole is formed that extends from said one end of said cylindrical semiconductor body and stops just prior to the other end of said cylindrical semiconductor body;
a second hole of a coaxial groove construction is formed in said cylindrical semiconductor and extends from said other end of said semiconductor body and stops just prior to said one end of said cylindrical semiconductor body;
a first electrode formed on the inner surface of said center hole and covers said one end of said cylindrical semi- conductor body as well as the main outer body of said cylindrical semiconductor body;

a second electrode formed on the inner surface of said coaxial groove and on said other end of said cylindrical semiconductor body that is surrounded by the opening of said second hole of coaxial groove construction;

and a passivation layer formed on said other end of said cylindrical semiconductor body that lies outside the opening formed by the opening of said second hole of coaxial groove construction;

wherein said cylindrical semiconductor body forms two radial layers of a coaxial nature that are folded back on one another.

2. A semiconductor Gamma Ray detector comprising:

a cylindrical semiconductor body of crystal construction having two ends at one end a center hole is formed that extends from said one end of said cylindrical semiconductor body and stops just prior to the other end of said cylindrical semiconductor body;

a second hole of a coaxial groove construction is formed in said cylindrical semiconductor body beginning at about ⅓ the total distance from the center of said other end and extends from said other end of said semiconductor body and stops just prior to said one end of said cylindrical semiconductor body;

a third hole of a coaxial groove construction is formed in said cylindrical semiconductor body beginning at about ⅔ the total distance from the center of said one end of said semiconductor body and extends from said one end of said semiconductor body and stops just prior to said other end of said cylindrical semiconductor body;

a first electrode formed on the inner surface of said center hole and covers said one end of said cylindrical semiconductor body between the center hole and the third hole as well as the inner surface of said third hole of a coaxial groove construction;

a second electrode formed on the inner surface of said second hole of coaxial groove construction and on said other end of said cylindrical semiconductor body as well as the main outer body of said cylindrical semiconductor body;

and a passivation layer formed on said one end of said cylindrical semiconductor body that lies outside the opening formed by said third hole of coaxial groove construction;

wherein said cylindrical semiconductor body forms at least two radial layers of a coaxial nature that are folded back on one another.

3. A semiconductor Gamma Ray detector comprising:

a cylindrical semiconductor body of crystal construction having two ends at one end a center hole is formed that extends from said one end of said cylindrical semiconductor body and stops just prior to the other end of said cylindrical semiconductor body;

a second hole of a coaxial groove construction is formed in said cylindrical semiconductor body beginning at about $1/n$ ($n=4, 5, 6, 7, \ldots$) the total distance from the center of said other end and extends from said other end of said semiconductor body and stops just prior to said one end of said cylindrical semiconductor body;

a third hole of a coaxial groove construction is formed in said cylindrical semiconductor body beginning at about $2/n$ ($n=4, 5, 6, 7, \ldots$) the total distance from the center of said one end of said semiconductor body and extends from said one end of said semiconductor body and stops just prior to said other end of said cylindrical semiconductor body;

an $i^{th}$ (if i is odd number) hole of a coaxial groove construction is formed in said cylindrical semiconductor body beginning at about $(i-1)/n$ ($n=4, 5, 6, 7, \ldots$) the total distance from the center of said one end of said semiconductor body and extends from said one end of said semiconductor body and stops just prior to said other end of said cylindrical semiconductor body;

an $i^{th}$ (if i is even number) hole of a coaxial groove construction is formed in said cylindrical semiconductor body beginning at about $(i-1)/n$ ($n=4, 5, 6, 7, \ldots$) the total distance from the center of said other end and extends from said other end of said semiconductor body and stops just prior to said one end of said cylindrical semiconductor body;

a first electrode formed on the inner surface of said center hole and covers said one end of said cylindrical semiconductor body between the center hole and all the odd number$^{th}$ holes as well as the inner surface of said all the odd number$^{th}$ holes of a coaxial groove construction (the main outer body of said cylindrical semiconductor body can be considered to be the $(n+1)^{th}$ hole);

a second electrode formed on all the inner surfaces of said the even number$^{th}$ hole of coaxial groove construction and on said other end of said cylindrical semiconductor body (the main outer body of said cylindrical semiconductor body can be considered to be the $(n+1)^{th}$ hole);

and a passivation layer formed on said one end of said cylindrical semiconductor body that lies outside the opening formed by said the $n^{th}$ hole of coaxial groove construction if n is odd number;

and a passivation layer formed on said other end of said cylindrical semiconductor body that lies outside the opening formed by said the $n^{th}$ hole of coaxial groove construction if n is even number;

wherein said cylindrical semiconductor body forms n radial layers of a coaxial nature that are folded back and forth between on one another.

4. A semiconductor Gamma Ray detector in any one of claims 1 to 3 further comprising an anode N+ contact of the first or the second electrode and a cathode P+ contact of other of the first or the second electrode.

5. A semiconductor Gamma Ray detector in any one of claims 1 to 3, wherein one or both of the first and second electrodes form a Schottky contact such that reverse leakage current is inhibited and the photo-generated signal current being effectively collected owning to the rectification effect.

6. A semiconductor Gamma Ray detector in any one of claims 1 to 3, wherein an anode N+ contact or a cathode P+ contact of one of the first or second electrode is formed and the other of the first or second electrodes a Schottky contact is formed, so the rectification effect is achieved.

7. A semiconductor Gamma Ray detector of claim 4, wherein the semiconductor material is Germanium and the P+ contact comprises implanted Boron and the N+ contact comprises diffused Lithium.

* * * * *